UNITED STATES PATENT OFFICE.

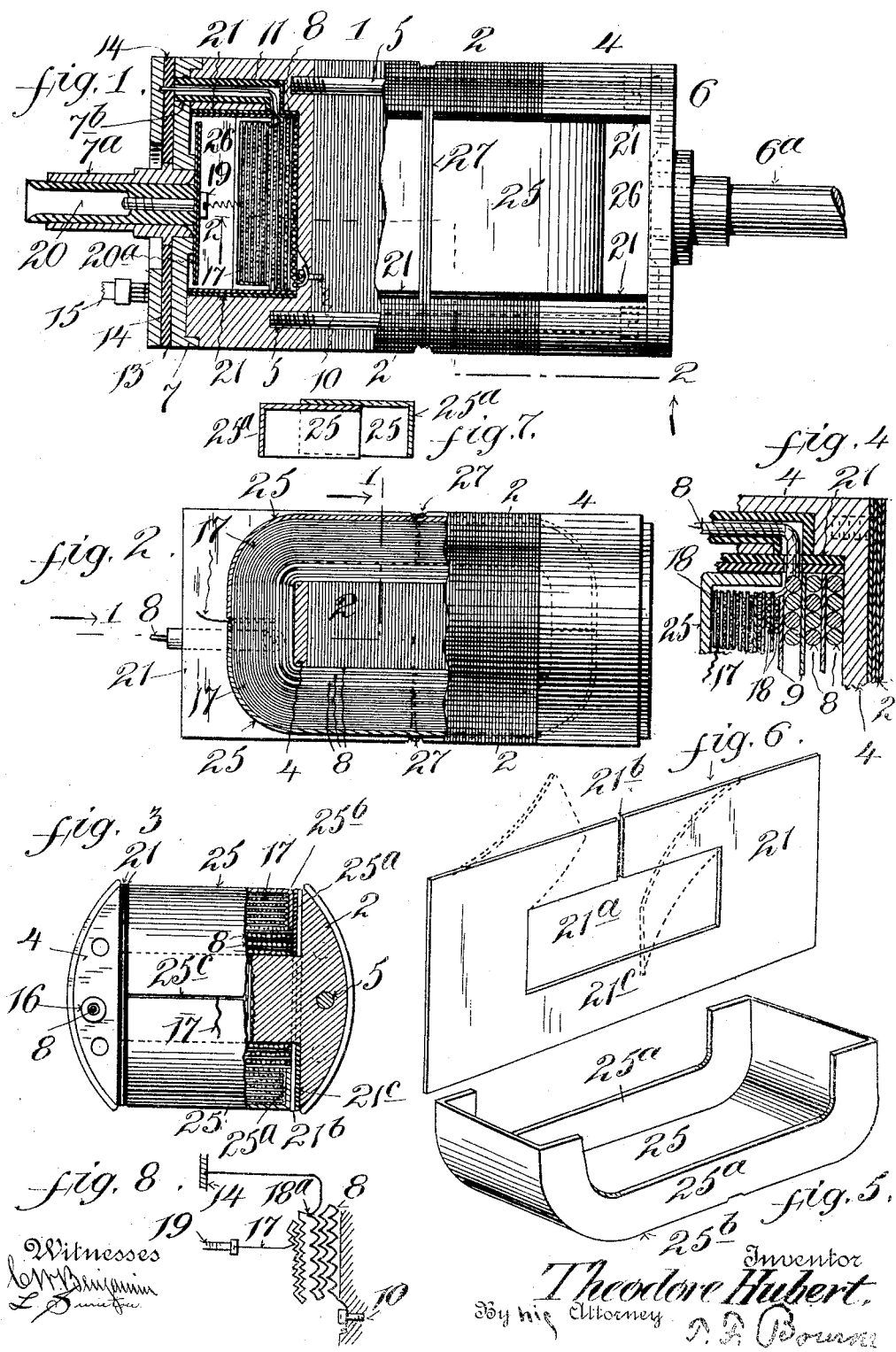

THEODORE HUBERT, OF NEW YORK, N. Y., ASSIGNOR TO CHARLES F. SPLITDORF, OF NEW YORK, N. Y.

MAGNETO-ARMATURE.

No. 854,421.      Specification of Letters Patent.      Patented May 21, 1907.

Application filed October 13, 1906. Serial No. 338,707.

*To all whom it may concern:*

Be it known that I, THEODORE HUBERT, a citizen of the United States, residing in New York city, borough of Brooklyn, New York, have invented certain new and useful Improvements in Magneto-Armatures, of which the following is a specification.

My invention relates to improvements in armatures for electric current generators, as for magnetos, and particularly with respect to magnetos producing high tension in the secondary winding, such, for instance, in the magneto disclosed in my application filed April 4, 1906, Serial No. 309,736, for improvements in electric ignition devices, wherein very high potential in the secondary circuit may be produced, such as 50,000 to 70,000 volts. Experiments by me have demonstrated that it is difficult to insulate the secondary winding of the armature against the leakage of such high voltage, as the current is liable to leak or jump through or across crevices or interstices between layers of insulating material and thereby injure the windings and other parts of the armature and magneto, such as where layers of mica or other friable insulating material are superimposed upon each other around the secondary winding. In accordance with my present invention, however, I am enabled to fully and permanently insulate the secondary winding of the armature against the escape of the secondary current, no matter how high the potential produced in such secondary winding, and to this end I provide corresponding insulating members to inclose the secondary winding, which insulator members overlie the winding and have integral flanges adapted to pass along the sides of the secondary winding in the spaces between the winding and the sides of the core of the armature, the inner edges of which flanges preferably rest upon the primary winding of the armature, the ends of these corresponding insulating members abutting or overlapping. Said insulating members may be in an integral piece of hard rubber or other suitable insulating material which will withstand the heat generated in the armature. The corresponding parts of the secondary winding are preferably at such a distance from metallic parts of the armature that any current that might leak or jump through the joint between the adjacent meeting edges of said insulating members will be unable to reach metallic parts. For further insulating protection I place between the sides of the windings and the poles of the armature, plates or strips of insulating material, such as hard rubber, the flanges of the insulating members preferably lying between said insulating plates and the sides of the secondary winding. The insulating members above described mounted over the windings as set forth are secured in place upon the armature, as by winding silk or other suitable strong insulating binder around the armature and its insulating members.

Other novel details of improvement and arrangement of parts pertaining to my invention will be more fully hereinafter set forth and then pointed out in the claims.

Reference is to be had to the accompanying drawings forming part hereof, wherein, Figure 1 is a side view of an armature embodying my improvements, partly broken away substantially on the line 1, 1, in Fig. 2, Fig. 2 is a side view, partly in longitudinal section on the broken line 2, 2, in Fig. 1, looking in the direction of the arrows, Fig. 3 is an end view of Fig. 2 looking from the left, partly broken away, Fig. 4 is an enlarged sectional view of a portion of the armature, illustrating a portion of my improved insulating member, Fig. 5 is a perspective view of one of the insulating members, Fig. 6 is a detail view of one of the insulating plates or sheets between the poles of the core and the windings of the armature, Fig. 7 is a detail sectional view of a modified form of the insulating members, and Fig. 8 is a diagrammatical view of the circuits of the armature.

Similar numerals of reference indicate like parts in the several views.

The armature may generally be of any suitable construction adapted for high tension magnetos, and in the example illustrated the core of the armature comprises a series of laminated plates 2 at opposite ends of which are metallic blocks 4, all secured together by bolts 5 passing longitudinally therethrough, as shown in Fig. 1. To said blocks 4 are secured heads 6, 7, respectively provided with spindles $6^a$, $7^a$ for supporting and rotating the armature. The primary winding 8, which may consist of any suitable number of layers or windings of insulated wire, having suitable insulation therebetween, such as layers of paper 9, has one end connected with the core 2, as by a screw 10, (see Fig. 1) and the other end of the wire 8 is shown passing through a bore 11 in one of the heads 4, which bore communicates with a hole $7^b$ in head 7 and passes thence through a hole in insulation 13 to a metal disk 14 to which said wire is connected. The insulation 13 insulates the head 7 from the disk 14, the parts 7, 13, and 14 being securely fastened together by any suitable means, as by screws, the primary circuit being completed by a brush or contact 15 engaging disk 14 and being grounded through the frame of the magneto with which the spindle $6^a$ is also grounded, any suitable make and break devices being provided in the primary circuit, such for instance as set forth in my application aforesaid. The secondary winding 17 of the armature, consisting of any suitable number of layers of insulated fine wires separated by insulation 18, such as paper strips, and wound upon the primary winding 8, has one end grounded through the armature, as by being connected with wire 8, as at $18^a$, and the other end of the secondary winding is shown connected with a screw 19 secured to an insulator 20 within spindle $7^a$ for engagement with a suitable detachable contact (not shown), but which may be arranged as shown in my application aforesaid, the insulator 20 having an integral head or flange $20^a$ to prevent current from leaking from screw 19 to the armature, and any suitable translating device or devices may be located in said circuit, such as spark plugs and distributers, which may be arranged as set forth in my said application. To insulate the sides of the windings 8 and 17 from the adjacent sides or walls of the armature I provide one or more insulating plates 21 between the armature walls and the windings, which may be of hard rubber or other suitable insulating material, such insulation being shown detached in Fig. 6. To have the insulation 21 as integral as possible and at the same time apply it to the assembled armature I provide such insulating plates with centrally disposed openings $21^a$ to receive the core of the armature and one part of such insulating plates is slit, as at $21^b$, whereby the same may be bent sidewise, as indicated in dotted lines in Fig. 6, to enable the insulation to be slipped over the armature core and placed against the inner walls of the armature. To insulate the spaces at the slits $21^b$ of the insulating plates 21 to prevent leakage of current therethrough, I provide two or more of said plates on each side of the armature and arrange their respective slits $21^b$ out of register so that the integral part of one insulating plate will register with the slit $21^b$ of the adjacent plate. This may be readily accomplished by inverting the slits $21^b$ of the adjacent plates 21 with respect to each other so that the slit $21^b$ of one plate will lie against the integral part $21^c$ of the adjacent plate, as shown in Fig. 3, whereby any current that would leak from the windings through a slit $21^b$ will be prevented from reaching the metal of the armature by the unslit or integral part $21^c$ of the adjacent insulating plate 21.

As high tension current from the secondary winding 17 would be liable to jump through any crevices in insulation, particularly at the outer portion of the winding, to the metal of the armature around the edges of the insulating plates 21, and to other adjacent metal of the magneto frame, I provide insulation in hollow or through like form at 25 adapted to fit over the winding 17 and at the sides thereof without any break in the insulation at the outer corners of winding 17, which insulation is clearly shown in perspective in Fig. 5. The insulating plates or caps 25 fit along the outer surface of winding 17 and around the end portions thereof where two of such insulating members meet, substantially at the middle of the winding, and said members have integral flanges $25^a$ extending parallel and from end to end of the member, which flanges project along the sides of winding 17, being shown disposed between said winding and the insulating plates 21, and whereby the two through-like or hollow members 25 with their flanges $25^a$ wholly inclose the secondary winding along its outer surface or periphery and at the sides thereof. The flanges $25^a$ are of such depth as to extend to and preferably engage the primary winding 8, for which purpose the winding 8 may be made wider than the secondary winding 17 providing spaces at the sides of the winding 17 adjacent the insulating plates 21 to receive the flanges $25^a$. The members 25 and their flanges $25^a$ may be molded in an integral or homogeneous piece of insulating material, such as hard rubber, or such material as will not only serve as an insulator but will withstand the heat generated in the windings. By having the flanges $25^a$ integral with the main body of the insulating member 25 so there shall be no break or crevice at the corners $25^b$ the secondary current generated in the winding 17 is wholly confined within the latter, and particularly at the periphery thereof where the most intense current exists.

The wire of the secondary winding 17 may project between the meeting edges $25^c$ of the insulating members 25, and by having the armature considerably longer than the length of winding 17 spaces 26 will be provided between the heads 6, 7 and the insulation 17 of such length as to prevent injurious action from any current that might leak through the joint at the edges $25^c$ of said insulating members. After the windings are placed upon the armature the insulating members 25 will be placed over the winding 17 on opposite sides thereof, and may be held in place by winding silk or other suitable material 27 around the armature and over the members 25.

While I have shown the members 25 and their flanges 25ᵃ on opposite edges made in single pieces respectively, each member 25, if preferred, may be made in two half portions each provided with a flange 25ᵃ the main parts being fitted one upon the other, as shown in the modification in Fig. 7, which will be applied in position over the windings one upon the other in obvious manner, the flanges 25ᵃ respectively passing between the sides of winding 17 and the armature, and the insulating members being held in place by the binder 27 as before mentioned. By having the insulating members 25 adapted to wholly inclose the winding 17 along its periphery, at its corners, and along its sides, without any breaks or crevices at the corners for the leakage of current, I am enabled to produce a simple, relatively cheap, and yet highly efficient, insulation for retaining the induced current within the secondary winding and preventing the escape of the current to metallic parts of the armature and magneto frame, and by having such insulating members with their flanges made integral there is no danger of the insulation becoming detached from the armature or disintegrating, which I consider an important improvement in this class of devices over the customary manner of wrapping the secondary winding with sheets of mica which are liable to become broken and displaced under the rapid rotation to which the armature is subjected, and wherein when such mica insulation becomes displaced or broken the secondary current is liable to leak to the adjacent metal with loss of electrical efficiency and injury.

Having now described my invention what I claim is:—

1. An armature provided with a winding and having insulation over the winding, and flanges integral with the insulation extending between the sides of the winding and the sides of the armature.

2. An armature having a winding providing spaces between the sides of the winding and the sides of the armature, and insulating members laid over the winding and provided with flanges integral therewith that extend into the said spaces to prevent the leakage of current to the metal of the armature.

3. An armature having a winding providing spaces between the sides of the winding and the sides of the armature, and insulating members laid peripherally upon the winding on opposite faces thereof and extended around the ends of the winding to meeting points, said insulating members having integral flanges extending from one end thereof to the other and located in the spaces between the sides of the winding and the armature, whereby the corners between the insulating members and their flanges are integral and unbroken to prevent the escape of current from the winding.

4. An armature provided with primary and secondary windings providing spaces between the sides of the armature and the adjacent sides of the secondary winding, and insulating members laid over the secondary winding on opposite faces thereof and extending unbroken around the respective ends of said winding to meeting points, said insulating members having integral flanges extending from one end to the other and located in said spaces between the sides of the armature and sides of the secondary winding.

5. An insulating member for an armature winding comprising a piece of insulating material relatively flat at its middle part and curved correspondingly at opposite ends and provided with parallel flanges at its edges that extend unbroken from end to end of the member providing a hollow inner space to receive an armature winding.

6. An armature comprising a series of laminated plates provided with heads forming a core, metallic blocks at opposite ends of said plates, screws passing through said blocks and plates securing them rigidly together, heads secured on the ends of said blocks and provided with spindles, primary and secondary windings upon said core, and insulating members located over the secondary winding and provided with integral flanges located between the secondary winding and the inner sides of the armature.

THEODORE HUBERT.

Witnesses:
   T. F. BOURNE,
   L. SWINTON.